United States Patent [19]

Suzuki

[11] Patent Number: 4,809,090
[45] Date of Patent: Feb. 28, 1989

[54] RECORDING/REPRODUCING SYSTEM HAVING A MAGNETIC HEAD OF PRECEDING-ERASE TYPE

[75] Inventor: Hiroshi Suzuki, Monroeville, Pa.

[73] Assignee: Kabushiki Kaisha Toshiba, Kawasaki, Japan

[21] Appl. No.: 222,376

[22] Filed: Jul. 20, 1988

Related U.S. Application Data

[63] Continuation of Ser. No. 66,974, Jun. 29, 1987, abandoned.

[30] Foreign Application Priority Data

Jun. 30, 1986 [JP] Japan .................. 61-153531

[51] Int. Cl.$^4$ .................................................. G11B 5/02
[52] U.S. Cl. ........................................ 360/46; 360/66; 360/61; 360/51
[58] Field of Search .................... 360/46, 66, 61, 51

[56] References Cited

U.S. PATENT DOCUMENTS 4,553,178 11/1985 Lynch ..................... 360/46

FOREIGN PATENT DOCUMENTS 53142386 5/1980 Japan ..................... 360/66

Primary Examiner—Alan Faber
Assistant Examiner—Kevin J. Fournier
Attorney, Agent, or Firm—Foley & Lardner, Schwartz, Jeffery, Schwaab, Mack, Blumenthal & Evans

[57] ABSTRACT

A magnetic disk apparatus has a magnetic head in contact with a flexible magnetic recording medium, for reading out data stored in the recording medium. The magnetic head of the apparatus is of the preceding-erase type. A converting circuit converts the output signal of the magnetic head to digital read data, and outputs it to the PLL circuit. The magnetic disk apparatus includes a preventing circuit for preventing the converting circuit from outputting to the PLL circuit the digital read data which corresponds to read out data from the DC erased areas in the tracks of said magnetic recording medium. The preventing circuit comprises an AGC amplifier for amplifying the signal read out of the magnetic head, a circuit for obtaining an envelope of the output signal of the AGC amplifier, and a circuit for preventing the converting circuit from outputting the read data when the signal level of the envelope is lower than a predetermined value.

12 Claims, 5 Drawing Sheets

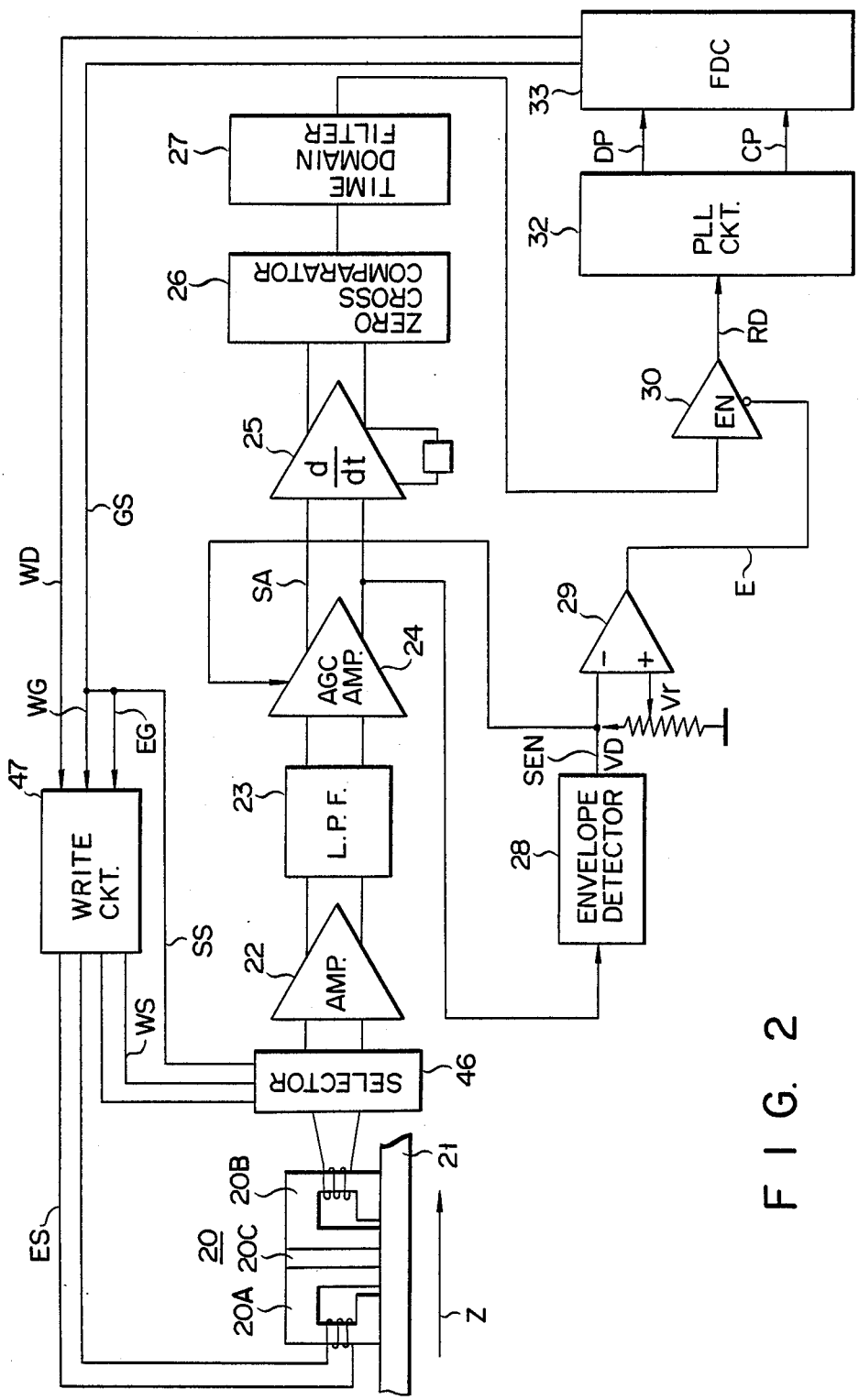
F I G. 2

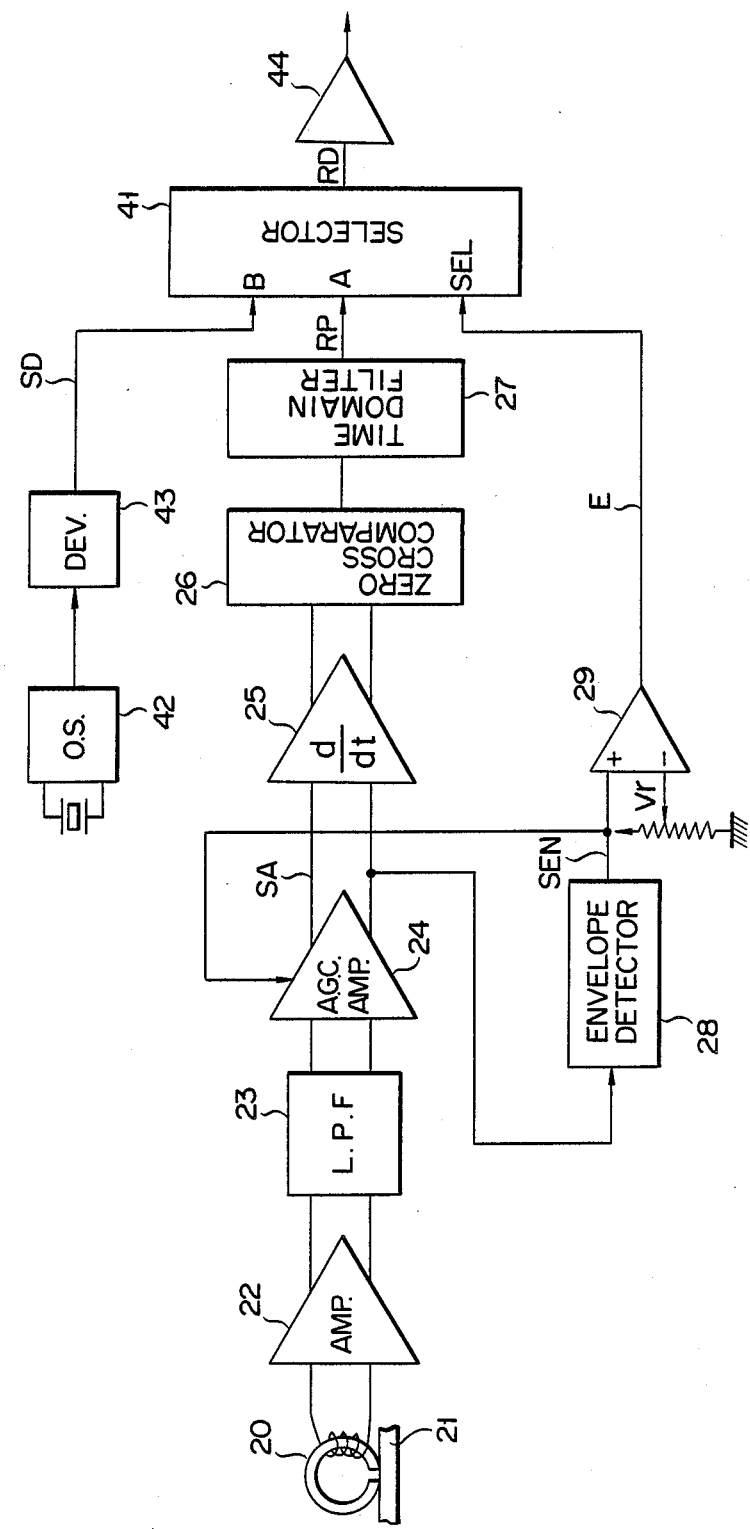
F I G. 4

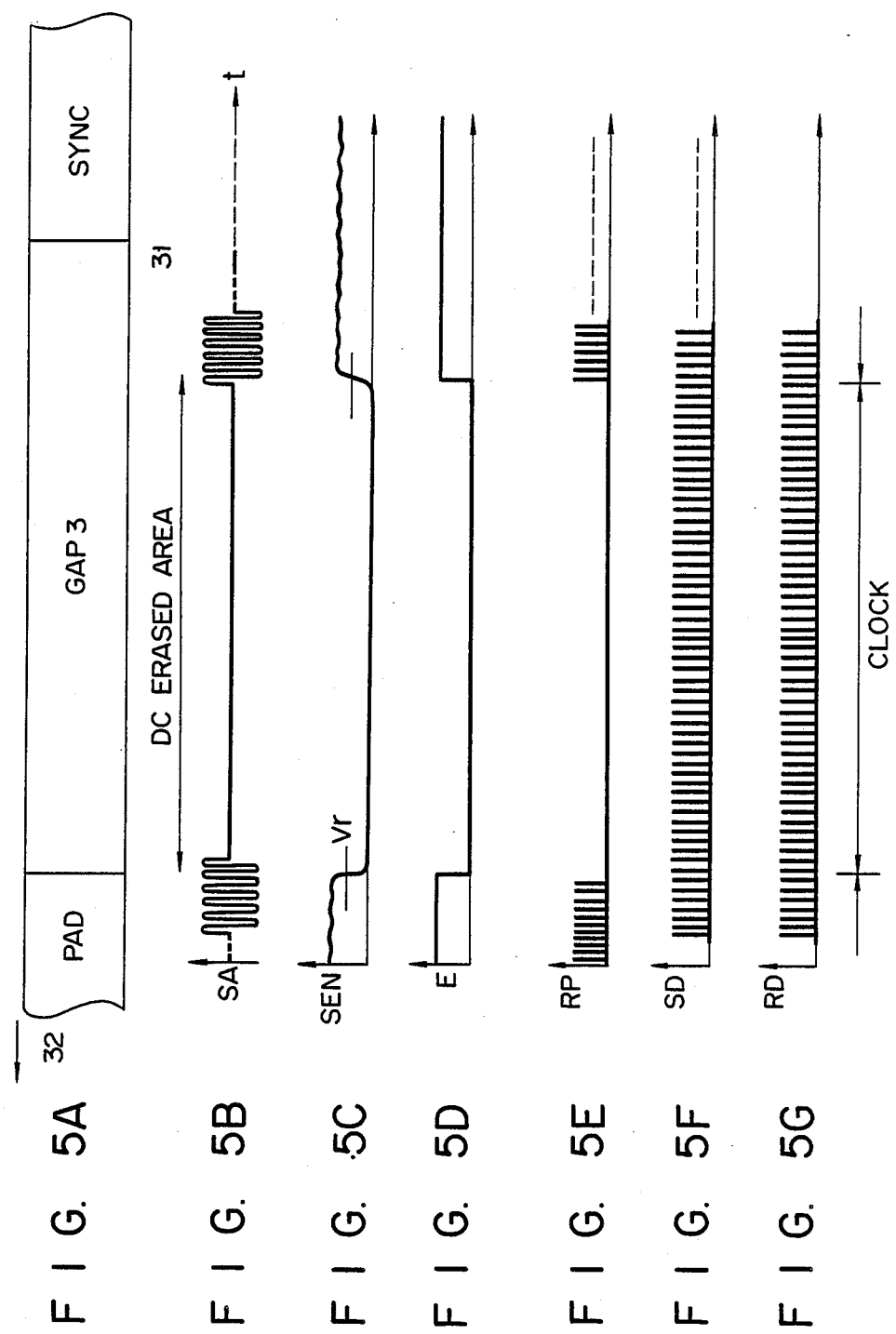

RECORDING/REPRODUCING SYSTEM HAVING A MAGNETIC HEAD OF PRECEDING-ERASE TYPE

This application is a continuation of application Ser. No. 066,974, filed June 29, 1987 now abandoned.

BACKGROUND OF THE INVENTION

This invention relates to a recording/reproducing system used in conjunction with a magnetic disk apparatus which reproduces data.

In the field of floppy disk apparatuses, a preceding-erase type magnetic head has recently been devised which is suitable for use with a high-density magnetic recording medium (disk). In the preceding-erase type magnetic head, an erase head is located in front of a read/write head in the rotational direction of the medium. Before new data are recorded in the medium by the read/write head, previously-recorded data are first erased by the erase head. When this type of magnetic head is employed, the erase head should preferably be turned on at a predetermined time before the recording of data on the medium, by the read/write head, begins, and turned off at a predetermined time before the recording of data ends. However, to be able to perform such a control procedure requires a controller, for turning the heads on and off, which is complicated in its construction. The conventional controller is incapable of performing such a control procedure, and for this reason, the erase head and the read/write head are turned on or off simultaneously.

Normally, a track has a format shown in FIG. 1A, i.e. in which one sector comprises an ID field and a data field.

The ID field comprises a synchronization area SYNC, an address mark area AM, an identification area ID, and a cyclic redundancy check area CRC. Information representative of the starting position and address of a sector are recorded in the ID field.

The data field stores data, and comprises synchronization area SYNC, address mark area AM, data area DATA, and cyclic redundancy check area CRC.

Synchronization areas SYNC of the ID field and the data field store synchronization data for a PLL circuit;

address mark areas AM store address mark data indicative of the starting position of the ID field or the data field;

ID area ID stores data such as the cylinder number, the side number, the sector number, and the length of the data field;

data area DATA stores data read out or written in by a user; and cyclic redundancy check areas CRC store data for checking whether or not the data read out from the ID field or from data field contains an error.

Gaps 1, 2, 3, and 4 are areas for absorbing a fluctuation of rotation and an error in a mechanical alignment.

Read data reproduced from the recording medium by the magnetic head are supplied to a data separator which includes a PLL circuit and an external synchronization detecting circuit.

The external synchronization detector detects the synchronization data in the read data, and upon detection of the synchronization data, the PLL circuit begins oscillating in synchronism with the read data and outputs data pulses and clock pulses.

When the PLL circuit operates in synchronism with the read data, an internal synchronization detector detects the synchronization data, on the basis of the data pulse and the clock pulse, and a floppy disk controller checks whether or not the following data, other than synchronization data, are address mark data.

When the address mark data are detected, the floppy disk controller reads out the data stored in the ID area ID or in data area DATA, on the basis of the data pulses and clock pulses. When data other than the address mark data are detected, the floppy disk controller stops operating for a predetermined time period, and then repeats the above-mentioned operation.

FIGS. 1B and 1C show the positions where the erase head and read/write head of the preceding-erase type magnetic head are turned on and off, during the time which data writing operation by the floppy disk controller. As is shown in FIGS. 1A to 1C, DC erased areas are formed in Gap 3, where data are erased by the erase head and new data are not recorded.

In such a system, when data identical to the synchronization data are recorded in the data areas, a problem arises in that the external synchronization detection circuit sometimes erroneously detects the synchronization area of the recording medium, with the result that the system may fail to read out the data from the data area. Specifically, when zero pattern data having a predetermined byte length is stored in the data area DATA, the external synchronization detection circuit detects the zero pattern data as the synchronization data. In this case, the PLL circuit begins the synchronization operation. However, the internal synchronization detection circuit cannot detect the synchronization data, with the result that the PLL circuit continues to perform the synchronization operation. The PLL circuit oscillates at a frequency different from the frequency of normal read data, due to irregular pulses derived from the DC erased area. Consequently, there is the possibility that the PLL circuit will be unable to read out even the normal data.

SUMMARY OF THE INVENTION

An object of the present invention is to provide a high reliability recording/reproducing system using a preceding-erase type magnetic head.

To achieve the above object, a recording/reproducing system is provided which comprises:

a magnetic head of preceding-erase type, in contact with a flexible magnetic recording medium, for recording data on said magnetic recording medium and reading out data stored in said recording medium, said magnetic head having a read/write head for writing data on, and reading data from, said magnetic recording medium, and an erase head arranged in front of said read/write head for erasing data recorded on said magnetic recording medium;

write means for turning said read/write head and said erase head on substantially simultaneously and for supplying a specified signal to said read/write head, to erase data recorded on said magnetic recording medium, and to write data on said magnetic recording medium;

analog signal-outputting means for outputting an analog signal corresponding to the data read out by said read/write head from said magnetic recording medium;

converting means for converting the analog signal to a digital signal and outputting the digital signal;

PLL (Phase Locked Loop) circuit means for receiving the digital signal, and for oscillating in synchronism with the digital signal, thereby to output data pulses and clock pulses;

readout means for receiving the data pulses and the clock pulses and reading out data from said magnetic recording medium in accordance with the data pulses and the clock pulses; and preventing means for preventing said converting means from outputting to said PLL circuit means the digital data reproduced from DC erased areas, exist on tracks of said magnetic recording medium, which have been erased and in which no new data has been written.

In the system having the above configuration, the digital signal (RD), which is reproduced from the DC erased areas in the tracks, of the magnetic recording medium (such as GAP3), is not output from the interface driver. This prevents the PLL circuit means (32) from oscillating at a frequency widely different from the original oscillating frequency, thereby ensuring normal oscillation. With the normal oscillation of the PLL circuit means (32), the data recorded in the magnetic recording medium (21) can be reliably read out.

BRIEF DESCRIPTION OF THE DRAWINGS

FIG. 2 is a block diagram illustrating a configuration of a first embodiment of a floppy disk apparatus and a data separator circuit;

FIG. 4 is a block diagram illustrating a configuration of a second embodiment of a floppy disk apparatus according to this invention; and FIGS. 5A to 5G are timing charts explaining an operation of the FIG. 4 configuration.

DETAILED DESCRIPTION OF THE PREFERRED EMBODIMENTS

Figure 1:
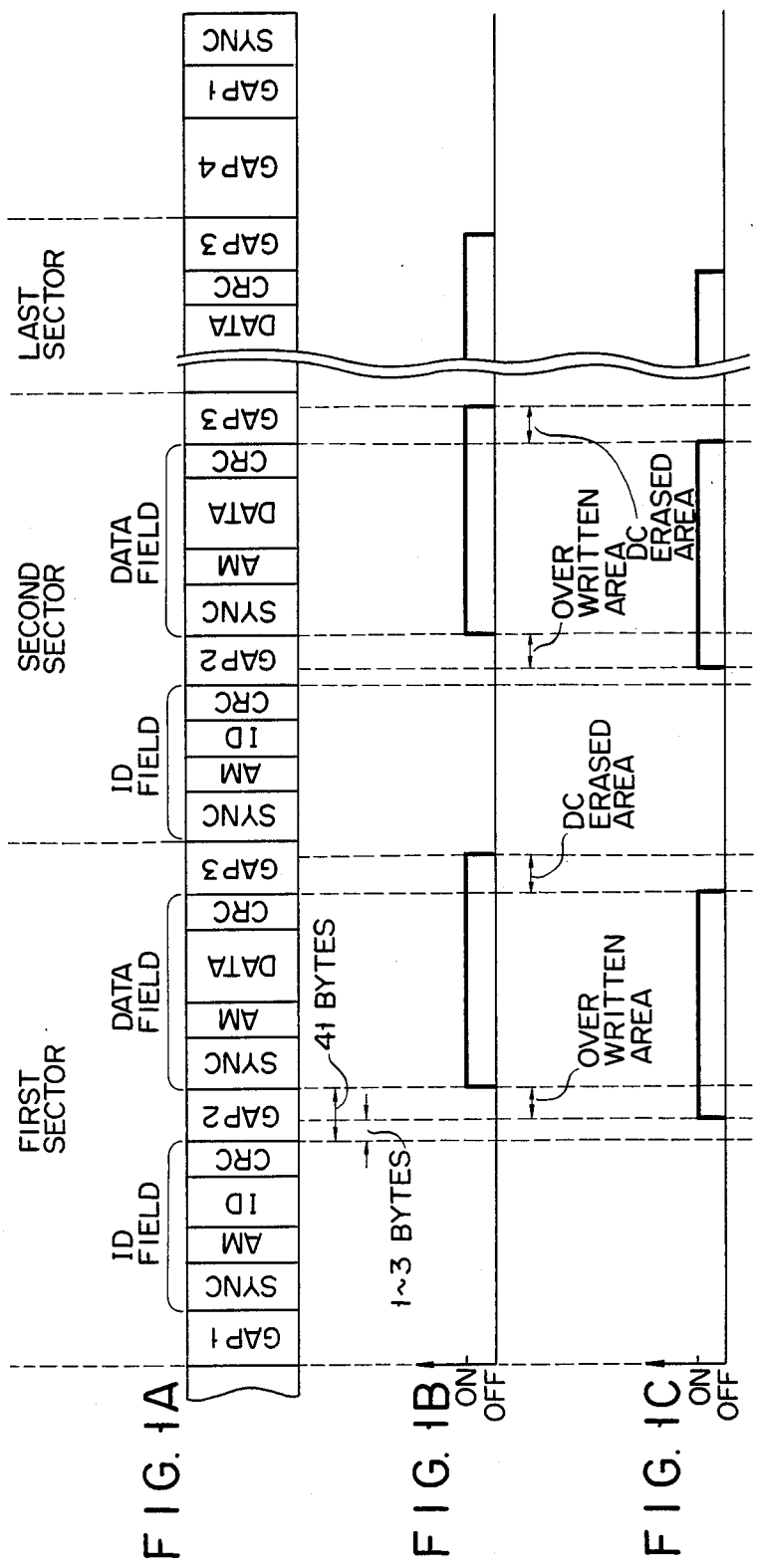
FIGS. 1A to 1C show the format of the tracks, and the on/off timings of the read/write head and the erase head when data is recorded in data fields.

Some specific embodiments of a magnetic recording/reproducing system for a magnetic disk apparatus, according to this invention will be described, referring to the accompanying drawings. FIG. 2 is a block diagram illustrating a first embodiment of this invention. In the figure, magnetic head 20 is a magnetic head of the preceding-erase type, which has erase head 20B, read/write head 20A and separator 20C. Separator 20C magnetically separates erase head 20B from read/write head 20B. Erase head 20B is located upstream of read/write head 20A with respect to the rotational direction of the medium 21.

FDC 33 receives write data WD from a host computer (not shown), and supplies write data WD to write circuit 47. FDC 33 also supplies gate signal GS to write circuit 47 and selector 46. Gate signal GS functions as write gate signal WG, erase gate signal EG and select signal SS. Write gate signal WG and erase gate signal EG are supplied to write circuit 47. Select signal SS is supplied to selector 46. Selector 46 supplies write signal WS to read/write head 20A when select signal SS is H level. Selector 46 supplies output signal of read/write head 20A to preamplifier 22 when select signal SS is L level.

The output signal of head 20 is supplied to preamplifier 22. Pre-amplifier 22 amplifies the output signal of magnetic head 20. The output signal of pre-amplifier 22 is supplied to AGC (automatic gain controlled) amplifier 24 via low-pass filter 23. Low-pass filter 23 removes the high-frequency noise of the output signal of pre-amplifier 22. AGC amplifier 24 keeps constant the amplitude of the output signal, and has a control terminal for gain adjustment. Output signal SA of AGC amplifier 24 is supplied to differential amplifier 25. Differential amplifier 25 detects peaks of output signal SA of AGC amplifier 24. The output signal of differential amplifier 25 is supplied to zero cross comparator 26. Zero cross comparator 26 outputs a pulse whose polarity is inverted at each zero cross point of output signal of differential amplifier 25, that is, each peak of the output signal SA of AGC amplifier 24. The output signal of zero cross comparator 26 is supplied to time domain filter 27. Time domain filter 27 removes pulses at abnormal intervals (erroneous pulses) caused by external noises and the like contained in the pulse signal from zero cross comparator 26. Filter 27 then outputs the pulse of normal intervals as the read data pulse. The output signal of time domain filter 27 is input to interface driver 30.

Output signal SA of AGC amplifier 24 is also supplied to envelope detection circuit 28. Envelope detection circuit 28 detects signal SA to obtain the envelope of signal SA. Envelope detection circuit 28 outputs detect result SEN (a signal which corresponds to the detected envelope) to the terminal for gain adjustment of AGC amplifier 24. According to the signal level of signal SEN, the gain of AGC circuit 24 is controlled, so that an output signal of a constant amplitude is obtained. The output signal SEN of envelope detection circuit 28 is also supplied to the inverting input terminal of comparator 29. The reference voltage Vr is supplied to the non-inverting input terminal of comparator 29. Comparator 29 supplies signal E to the control terminal of interface driver 30. Signal E is high in level when the output voltage of envelope detection circuit 28 is below the reference voltage Vr. When signal E from comparator 29 is low, interface driver 30 is in an operable state, and supplies the output signal of time domain filter 27 to magnetic record/reproduction system 31 as read data RD.

PLL circuit 32 internally includes a voltage controlled oscillator (not shown). PLL circuit 32 operates so that the phase of the output pulses are equal to that of the input pulses. PLL circuit 32 oscillates in synchronism with read data RD. It then separates read data RD into data pulses DP and clock pulses CP. Data pulses DP is a pulse signal which represents the data recorded on the tracks of magnetic recording medium 21. Clock pulses CP is a pulse signal which represents the timing for reading the data. FDC 33 is connected to a host computer (not shown), for example. In response to the command of the host computer, FDC 33 performs the data read-out on the basis of data pulses DP and clock pulses CP.

The operation of the system of FIG. 2 will be described.

First, the recording operation will be described.

The host computer supplies a write command to FDC 33. In response to this command, FDC 33 causes gate signal GS to rise to H level. Gate signal GS functions as write gate signal WG, erase gate signal EG and select signal SS. Write circuit 47 receives signals WG and EG. When write gate signal WG and erase signal EG rise to H level, write circuit 47 generates write signal WS and erase signal ES on the bases of write data WD supplied from host computer via FDC 33 to write circuit 47. Write circuit 47 supplies write signal WS to selector 46, and erase signal ES to erase head 20B. When select signal SS rises to H level, selector 46 supplies write signal WS, which has been supplied from write circuit 47, to read/write head 20B.

By the above-mentioned operation, the data recorded on medium 21 is erased by erase head 20A, and new data is recorded on medium 21 by the read/write head 20B.

Reproducing operation will now be described.

FDC 33 causes gate signal GS to fall to L level. When gate signal GS falls to L level, write circuit 47 stops generating erase signal ES and write signal WS. When write signal WS is not supplied to read/write head 20B, read/write head 20B reads the data recorded on medium 21, and outputs a signal corresponding to this data. When gate signal GS falls to L level, selector 46 supplies the output signal of read/write head 20B to preamplifier 22.

Each track of magnetic recording medium 21 also has a format shown in FIG. 1A. The on/off timings of the erase head and the read/write head when the data is recorded, are the same as shown in FIGS. 1B and 1C.

Figure 3:
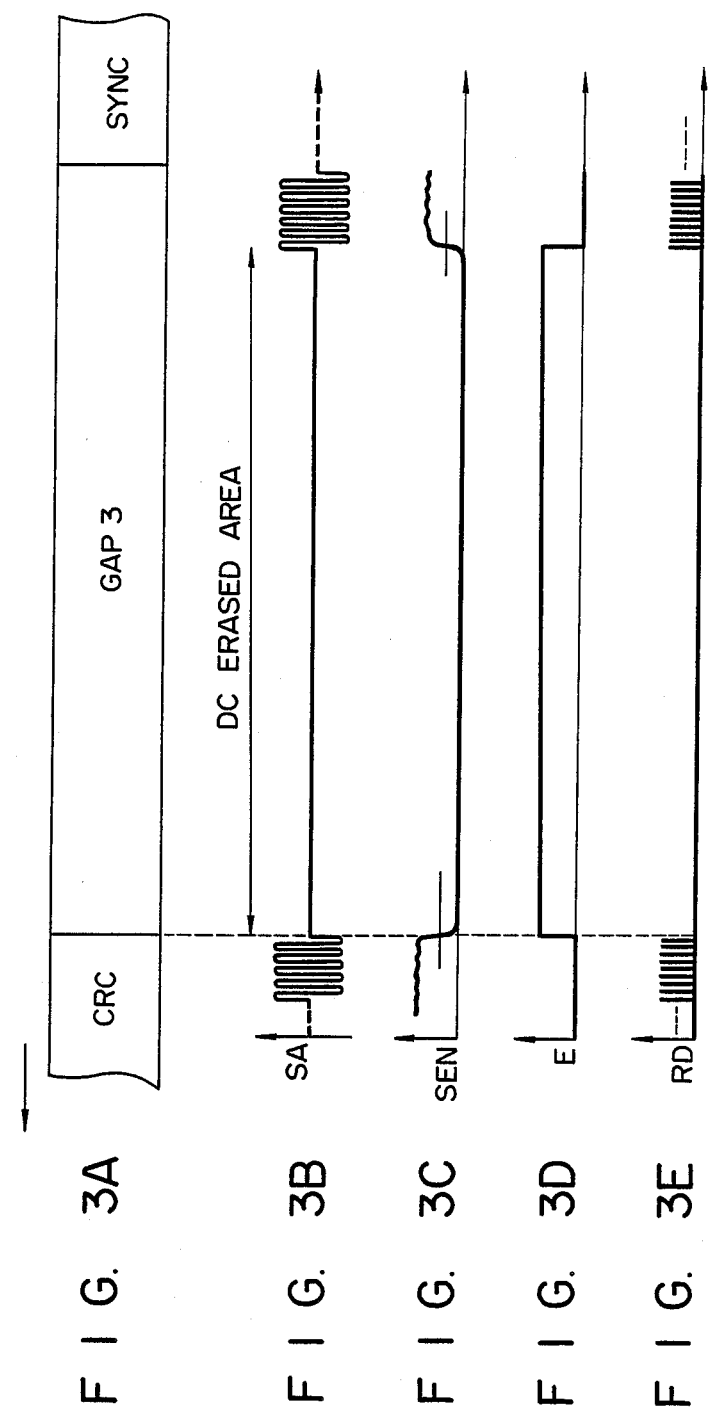
FIGS. 3A to 3E are timing charts useful in explaining an operation of the FIG. 1 configuration.

When magnetic head 20 reads the data in the areas of the tracks on which data has been recorded, such as areas CRC, the output signal of magnetic head 20 is supplied to AGC amplifier 24 via pre-amplifier 22 and low-pass filter 23. AGC amplifier 24 outputs signal SA of a constant amplitude, as shown in FIG. 3B. The output signal of AGC amplifier 24 is differentiated by differential amplifier 25. The differential signal is input to zero cross comparator 26. Differential output signal SA of AGC amplifier 24 is converted into a pulse signal by zero cross comparator 26. The pulse signal is input to interface driver 30 as read data pulse signal, after its abnormal pulses are removed by time domain filter 27.

Envelope detection circuit 28 detects the envelope of output signal SA of AGC amplifier 24, and output signal SEN (which corresponds to the envelope), as shown in FIG. 3C. On the basis of the signal level of signal SEN, the amplification of AGC amplifier 24 changes, so that output signal SA of a constant amplitude is obtained. Comparator 29 receives signal SEN, and outputs low-level signal E, because the voltage level of signal SEN is larger than the reference voltage Vr (FIG. 3D). Vr is set to such a level that, in the normal state, the voltage level of signal SEN is larger than the reference voltage. Upon receipt of low-level signal E, interface driver 30 supplies the read data pulse from time domain filter 27 to PLL circuit 32. The PLL circuit 32 oscillates in synchronism with read data RD, and separates read data RD into data pulse DP and clock pulse CP. On the basis of data pulses DP and clock pulses CP, FDC 33 performs the data read-out.

When magnetic head 20 advances to the DC erased areas (GAP3) on the track of magnetic recording medium 21, the amplitude of the output signal of preamplifier 22 is substantially zero. The amplitude of output signal SA of AGC amplifier 24 is also substantially zero, as shown in FIG. 3B. The output of time domain filter 27 is instable. Signal SEN falls to zero level, which is below the reference voltage level Vr, as shown in FIG. 3C. Comparator 29 outputs high-level signal E. Upon receipt of high-level signal E, interface driver 30 is in a high output impedance state, and does not output read data RD. PLL circuit 32 oscillates, while keeping the oscillating frequency up to this point.

When magnetic head 20 moves out of the DC erased area, and reads the data recorded area (SYNC), once again, AGC amplifier 24 outputs signal SA of a predetermined amplitude, as shown in FIG. 3B. Signal SEN exceeds the reference voltage level Vr, and the output signal of comparator 29 becomes low in level. Interface driver 30 transfers the read data pulse from time domain filter 27 to record/reproduction circuit 31 (FIG. 3E).

In this embodiment, when magnetic head 20 reads the DC erased areas in the tracks, as shown in FIG. 3E, read data RD is not output from interface driver 30. This prevents the instable read data (whose period, amplitude and the like are irregular) from the data erased areas (a high frequency pulse, for example) from being supplied to PLL circuit 32 and so on. Therefore, the sync frequency of PLL circuit 32 is not varied by the instable read data RD read out from the DC erased area, and PLL circuit 32 always operates in synchronism with the normal read data RD. This ensures the stable operation of PLL circcuit 32 used in the data separator, even when the track contains the data erased areas.

Next, a second embodiment of a magnetic recording-/reproducing system of this invention will be described, referring to FIG. 4. Most of the portions of the FIG. 4 configuration are the same as those of the FIG. 2 configuration. Therefore, only the features of the second embodiment will be described.

The structural features shown in FIG. 4, as compared with that shown FIG. 2, are: (1) Selector 41 is provided instead of interface driver 30; (2) Oscillator 42 and frequency divider 43 are additionally used; (3) Buffer 44 is additionally used; and (4) The polarities of the input terminal of comparator 29 are opposite to those of the comparator 29 in the first embodiment. Selector 41 receives the output of time domain filter 27 at input terminal A, and the output signal of frequency divider 43, at input terminal B. Selector 41 receives the output signal E of comparator 29 at the select control terminal SEL. When supplied with high-level signal E from comparator 29, separator 29 selects read data pulse RP from time domain filter 27, and outputs the pulse RP to buffer 44. When signal E is low, selector 41 selects the clock signal from frequency divider 43, and outputs the clock signal to buffer 44. For oscillator 42, a system clock generating circuit used in the controller of a floppy disk apparatus may be used, for example. Frequency divider 43 frequency divides the clock signal from oscillator 42, and outputs a clock at a frequency corresponding to the transfer rate of the normal read data RD.

The operation of the second embodiment of FIG. 4 will be described, referring to FIGS. 5A to 5G. When magnetic head 20 reads data from the area which is not a DC erased areas in the tracks, AGC amplifier 24 outputs signal SA of a predetermined amplitude (FIG. 5B). Signal LSEN is in a level above the reference level Vr (FIG. 5C), and output signal E of comparator 29 is high in level. Upon receipt of high-level signal E, selector 41 selects the output signal RP of time domain filter 27 (FIG. 5E) and outputs signal RD. Output data RD of selector 41 is supplied to magnetic record/reproduction system 31 via buffer 44.

When magnetic head 20 starts reading data from the DC erased areas in the tracks, the amplitude of output signal SA of AGC amplifier 24 becomes small (FIG. 5B), and time domain filter 27 stops outputting pulses (FIG. 5E). Signal SEN is also below the reference level Vr (FIG. 5C), and signal E becomes low in level (FIG. 5D). Upon receipt of low-level signal E, selector 41 outputs clock SD from frequency divider 43 as read data RD.

As shown in FIG. 5F, the clock SD from frequency divider 43 is a pulse signal at a frequency corresponding to the transfer rate of the normal read data RD. PLL circuit 32 in the data separator oscillates in synchronism with the input data, in the same manner as when normal read data RD is supplied.

As seen from the foregoing, according to this invention, in a magnetic disk apparatus using a magnetic head of the preceding-erase type, the read data reproduced from the DC erased areas of the magnetic recording medium is prevented from being supplied to the magnetic record/reproduction system. This prevents the PLL circuit of the magnetic record/reproduction system from oscillating in synchronism with the signal with instable period that is reproduced from the data erased area, and therefore, from operating erroneously or instably. The read data with a high reliability can be obtained.

Circuit configuration of this invention is not limited to those shown in FIGS. 2 and 4. Other circuit configuration can be selected. And also, FDC 33 may be provided in a magnetic disk apparatus or outside of the apparatus.

The present invention can be applied to a magnetic disk apparatus having a tunnel erase head, a straddle erase head, and so on. Accordingly, data can be correctly reproduced from a medium, on which the data has been written by the preceding-erase type magnetic head, by the magnetic disk apparatus having the tunnel erase head or the straddle erase head.

What is claimed is:

1. A magnetic recording/reproducing system for a magnetic disk apparatus, comprising:
   head means having a preceding-erase type magnetic head in contact with a flexible magnetic recording medium, for reading out data stored in said recording medium, and for outputting an analog signal corresponding to the read out data;
   converting means for converting the output signal of said head means to digital read data and outputting the digital read data; and
   preventing means for preventing said converting means from outputting said digital read data which corresponds to read out data from DC erased areas in tracks of said magnetic recording medium.

2. A system according to claim 1, wherein said preventing means includes amplitude-detecting means for detecting the amplitude of the output signal from said head means, means for comparing the amplitude detected by said amplitude-detecting means with a predetermined reference level, and means for preventing the signal of said converting means from being output when said amplitude is lower than said reference level.

3. A system according to claim 2, wherein said magnetic head means includes an automatic gain control amplifier for amplifying the output signal of said magnetic head, and said comparing means includes means for obtaining the envelope of the output signal of said gain control amplifier and means for comparing said envelope and said reference signal.

4. A system according to claim 1, wherein said preventing means includes means for detecting an envelope of the output signal of said head means, means for comparing the envelope detected by said envelope-detecting means with a predetermined reference level, and means for preventing the signal of said converting means from being output when the signal level of the detected envelope is lower than said reference level.

5. A system according to claim 1, further comprising means for outputting a clock signal at a predetermined frequency, and in which said preventing means selects and outputs said clock signal when said preventing means prevents the output of said read data.

6. A system according to claim 1, wherein said converting means supplies said digital read data to a PLL circuit of a data separator.

7. A recording reproducing system for a rotating flexible magnetic recording medium having recording areas for recording information, comprising:
   signal read/write means for reproducing a read signal from the magnetic recording medium and recording a write signal on said magnetic recording medium;
   said signal read/write means including a magnetic head of preceding-erase type having a read/write head for recording the write signal on the recording medium and reproducing a signal corresponding to the read signal from the magnetic recording medium, and an erase head arranged on the upstream side of the read/write head along the direction of rotation of the recording medium, for erasing a signal previously recorded on the magnetic recording medium prior to recording the write signal by the read/write head;
   control means for supplying the signal read/write means with write data corresponding to the write signal to record the write data on the recording medium;
   the signal read/write means activating the erase head until the write signal has been recorded on the recording medium so that a DC-erased area, in which the previously recorded signal has been erased and no new signal has been written, is formed in a trailing portion of each recording area;
   PLL (Phase Locked Loop) circuit means receiving the read signal, for generating data pulses and clock pulses from said read signal by oscillating in synchronism with said read signal and sending the data pulses and the clock pulses to the control means; and
   preventing means for preventing the signal read/write means from outputting to the PLL circuit means the read signal reproduced from the DC-erased areas.

8. A system according to claim 7, which further comprises means for outputting a specific clock signal, and in which said preventing means outputs the clock signal when said preventing means prevents said signal read/write means from outputting the read signal.

9. A system according to claim 7, wherein the preventing means includes DC-erased area detecting means for detecting that the signal read/write means reproducing the read signal from the DC-erased areas, and the preventing means prevents the signal read/write means from outputting to the PLL circuit means the read signal in response to such detection by the DC-erased area detecting means.

10. A system according to claim 7, wherein the signal read/write means includes analog signal-outputting means for outputting the read signal of analog type corresponding to the recorded data read out by the read/write head from the magnetic recording medium, and converting means for converting the analog read signal to the read signal of digital type.

11. A system according to claim 10, wherein said preventing means has amplitude-detecting means for detecting the amplitude of the analog read signal, means for comparing the amplitude detected by the amplitude-detecting means with a predetermined reference value, and means for preventing said converting means from outputting the digital read signal to said PLL circuit means when the amplitude is less than the predetermined reference value.

12. A system according to claim 11, wherein said preventing means further includes envelope-detecting means for generating an envelope signal from the output signal of said amplitude-detecting means, means for comparing the envelope signal with a predetermined reference value, and means for preventing said converting means from outputting the digital read signal to said PLL circuit means when the amplitude of the envelope signal is less than the predetermined reference value.

* * * * *